(12) United States Patent
Wu et al.

(10) Patent No.: US 9,036,259 B2
(45) Date of Patent: May 19, 2015

(54) AUTOSTEREOSCOPIC DISPLAY APPARATUS

(71) Applicant: AU Optronics Corporation, Hsin-Chu (TW)

(72) Inventors: Hsin-Ying Wu, Hsin-Chu (TW); Cheng-Han Tsao, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 195 days.

(21) Appl. No.: 13/786,545

(22) Filed: Mar. 6, 2013

(65) Prior Publication Data

US 2014/0022635 A1    Jan. 23, 2014

(30) Foreign Application Priority Data

Jul. 18, 2012 (TW) .............................. 101125830 A

(51) Int. Cl.
G02B 27/22 (2006.01)

(52) U.S. Cl.
CPC .................................. *G02B 27/2214* (2013.01)

(58) Field of Classification Search
None
See application file for complete search history.

(56) References Cited

U.S. PATENT DOCUMENTS

| 5,953,148 | A | 9/1999 | Moseley et al. |
| 6,064,424 | A | 5/2000 | van Berkel et al. |
| 6,118,584 | A | 9/2000 | Van Berkel et al. |
| 2007/0070476 | A1* | 3/2007 | Yamada et al. ................... 359/9 |
| 2008/0079662 | A1 | 4/2008 | Saishu et al. |
| 2009/0273834 | A1 | 11/2009 | Korenaga |
| 2012/0320288 | A1* | 12/2012 | Baek et al. ........................ 349/5 |
| 2013/0114007 | A1* | 5/2013 | Lin et al. ......................... 349/15 |

FOREIGN PATENT DOCUMENTS

| CN | 101620319 A | 1/2010 |
| JP | 2002-228974 | 8/2002 |

\* cited by examiner

*Primary Examiner* — Jade R Chwasz
(74) *Attorney, Agent, or Firm* — WPAT, PC; Justin King

(57) ABSTRACT

An autostereoscopic display apparatus includes a substrate, a plurality of sub-pixels, a plurality of concave lens structures, a middle layer and a lenticular layer. The sub-pixels are disposed on the substrate, and each sub-pixel includes a light permeable area and at least one light masking area. The concave lens structures are disposed on the sub-pixels and on the optical paths of the light permeable areas. The middle layer is disposed on the concave lens structures, wherein the concave lens structures is used to expand the illumination distribution of the light from the light permeable areas of the sub-pixels, so as to form a plurality of virtual sub-pixel patterns. The projections of virtual sub-pixel patterns respectively projected to the sub-pixels cover the light masking areas of the sub-pixels. The focal point of the lenticular layer falls on the virtual sub-pixel patterns.

16 Claims, 11 Drawing Sheets

AUTOSTEREOSCOPIC DISPLAY APPARATUS

RELATED APPLICATIONS

This application claims priority to Taiwan Application Serial Number 101125830, filed Jul. 18, 2012, which is herein incorporated by reference.

BACKGROUND

1. Technical Field

Embodiments of the present invention relate to a display. More particularly, embodiments of the present invention relate to an autostereoscopic display apparatus.

2. Description of Related Art

The stereoscopic displays are generally categorized as a stereoscopic display with an eyewear and an autostereoscopic display that is glasses free. Because the viewer can see 3D images without any eyewear or glasses via the autostereoscopic display, the uncomfortable feeling from the glasses wearing can be addressed. Therefore, the autostereoscopic display is becoming the mainstream in the current research and development of the 3D display.

A typical autostereoscopic display apparatus is a lenticular 3D display, in which a lens is disposed over the pixel for generating two distinct images. These distinct images are respectively sent to the viewer's two eyes, so that the viewer's brain can fuse the images to generate a sense of depth, thereby forming a 3D image in the brain.

However, because some black masks exist between the sub-pixels. At certain viewing angles, the lens on the pixel focuses on the black masks, such that the viewers would see many black stripes. These black stripes are called Moiré-Like Pattern (MLP), and their existence seriously reduces the image quality presented by the autostereoscopic display.

Researches to solve the issue of MLP have been made, and some references are incorporated thereinto as described below:

In the U.S. Pat. No. 6,118,584, the sub-pixels are slanted, so that the sudden drop in light intensity at certain viewing angles of the typical mask of the scan lines can be reduced. As such, the viewers would be less noticed by the non-uniform intensity caused by the black mask during changing the viewing angle. Although such structure may somewhat alleviate the MLP, it is still palpable to human eyes.

In the U.S. Pat. No. 6,064,424, a slanted lens is provided to achieve similar effect as that in the U.S. Pat. No. 6,118,584. Parameters like the horizontal pitch ratio and the slanted angle are optimized in view of various numbers of parallaxes. However, similar to the U.S. Pat. No. 6,118,584, the MLP is somewhat alleviated but still palpable.

In the U.S. Pat. No. 5,953,148, a special-shaped mask is used in the sub-pixel to alleviate the MLP. This special-shaped mask can make the light intensity remain almost constant along the lateral direction of the sub-pixels. In particular, by overlapping the light permeable area of these sub-pixels of the two adjacent sub-pixels in the area across two adjacent sub-pixels, the opening of each observed sub-pixel in the lateral direction remains constant. However, the MLP is somewhat alleviated but still palpable.

U.S patent application no. 2008/0079662A1 proposes the mask structure similar to that in the U.S. Pat. No. 5,953,148, and the mask can equalize the observed intensity of transmitted light in the lateral direction. The difference between U.S patent application no. 2008/0079662A1 and the U.S. Pat. No. 5,953,148 is that the light permeable areas of two adjacent sub-pixels along the lateral direction are also required to be overlapped with each. However, in addition to the aforementioned disadvantages in the U.S. Pat. No. 5,953,148, this structure is further limited by the size of the circuit lines around the sub-pixel and the slanted angle, which seriously reducing the aperture ratio of the sub-pixels.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with one embodiment of the present invention, an autostereoscopic display apparatus includes a substrate, a plurality of sub-pixels, a plurality of concave lens structures, a first middle layer and a lenticular layer. The sub-pixels are disposed on the substrate, and each of the sub-pixels includes a light permeable area and at least one light masking area. The concave lens structures are respectively disposed on the sub-pixels and on the optical paths of the light permeable areas of the sub-pixels. The first middle layer is disposed on the concave lens structures. The concave lens structures are used to expand the illumination distribution of the light from the light permeable areas of the sub-pixels, so as to form a plurality of virtual sub-pixel patterns in the first middle layer. The projections of the virtual sub-pixel patterns respectively projected to the sub-pixels cover the light permeable areas and the light masking areas of the sub-pixels. The focal point of the lenticular layer falls on the virtual sub-pixel patterns.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
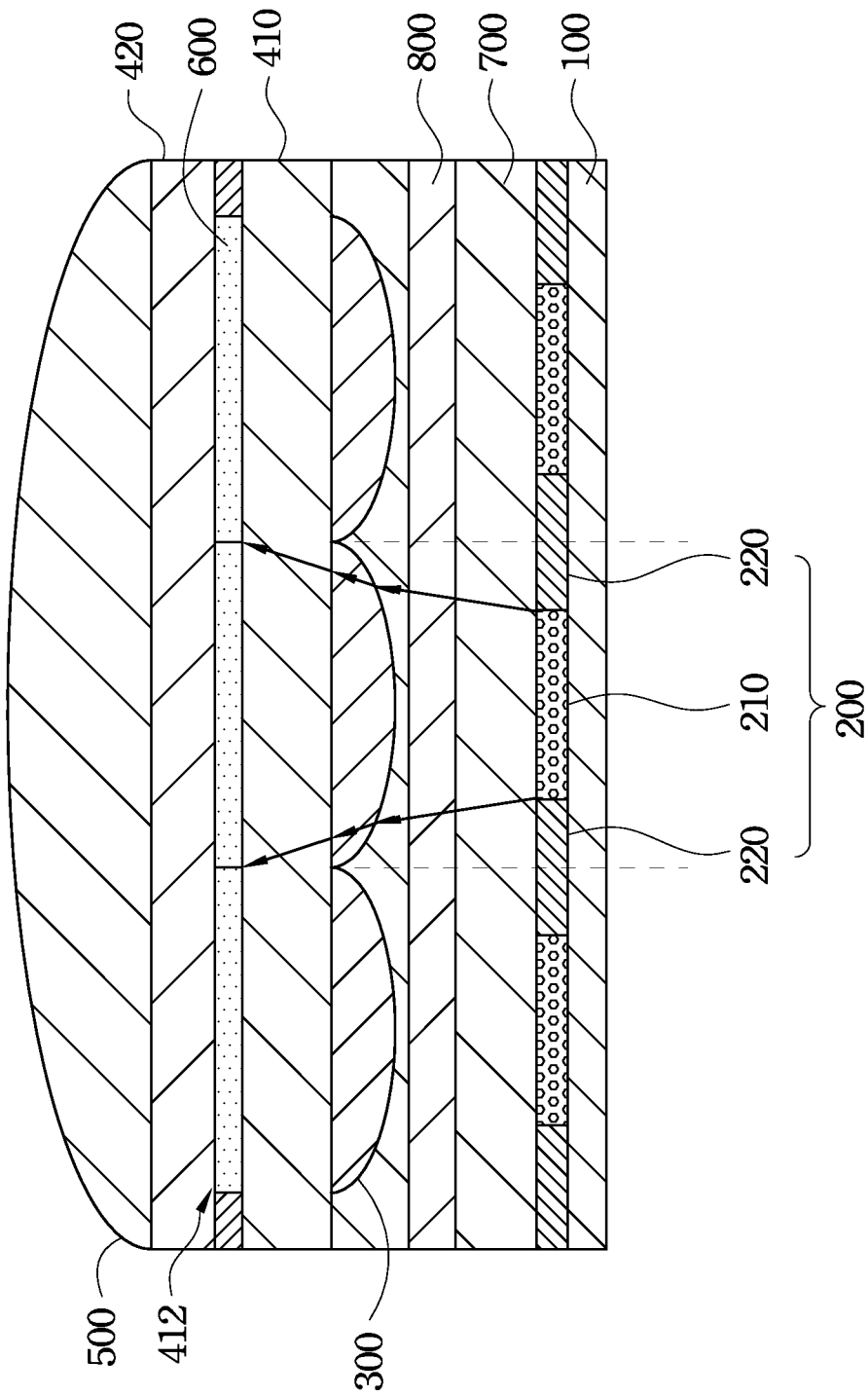
FIG. 1 is a cross-sectional view of an autostereoscopic display apparatus in accordance with one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a cross-sectional view of an autostereoscopic display apparatus in accordance with one embodiment of the present invention. As shown in FIG. 1, the autostereoscopic display apparatus includes a substrate 100, a plurality of sub-pixels 200, a plurality of concave lens structures 300, a first middle layer 410 and a lenticular layer 500. The sub-pixels 200 are disposed on the substrate 100, and each of the sub-pixels 200 includes a light permeable area 210 and at least one light masking area 220. The concave lens structures 300 are respectively disposed on the sub-pixels 200 and on the optical paths of the light permeable areas 210 of the sub-pixels 200. The first middle layer 410 is disposed on the concave lens structures 300. The concave lens structures 300 are used to expand the illumination distribution of the light from the light permeable areas 210 of the sub-pixels 200, so as to form a plurality of virtual sub-pixel patterns 600 in the first middle layer 410. The projections of the virtual sub-pixel patterns 600 cover the light permeable areas 210 and the light masking areas 220 of the sub-pixels 200. The focal point of the lenticular layer 500 falls on the virtual sub-pixel patterns 600.

In this embodiment, the concave lens structures 300 can be utilized to expand the light permeable areas 210 of the sub-pixels 200 to form virtual sub-pixel patterns 600. These virtual sub-pixel patterns 600 can shade the light masking areas 220 of the sub-pixels 200, and the focal point of the lenticular layer 500 falls on the virtual sub-pixel patterns 600. In other words, the lenticular layer 500 focuses on the virtual sub-pixel patterns 600, so that the viewers can see the virtual sub-pixel patterns 600, instead of seeing the light masking areas 220 of the sub-pixels 200. Accordingly, the MLP displayed on the typical autostereoscopic display apparatus can be removed, and the display quality can be improved. Further, because the structures of sub-pixels 200 are not modified, the aperture ratio is not reduced.

It is noted that the description "the feature A is disposed on the feature B" in this specification not only refers to the embodiment that the feature A directly contacts the feature B, but also refers to the embodiment that an additional feature C is disposed between the feature A and the feature B.

It is also noted that the description that "the projection of the feature A . . . covers the feature B" in this specification refers that the pattern formed by vertically projecting the feature A to the plane of the feature B is overlapped with the feature B.

It is further noted that although the terms first, second, third, etc. may be used herein to describe various elements, these elements should not be limited by these terms. These terms are only used to distinguish one element from another, and these elements are not necessarily different in function.

In some embodiments, the virtual sub-pixel patterns 600 are adjacent without intervals. In some embodiments, boundaries of the virtual sub-pixels 600 are partially overlapped. Therefore, the adjacent or partially overlapped virtual sub-pixels 600 can effectively shade the light masking area 220 of the sub-pixel 200, thereby preventing the MLP.

Figure 2:
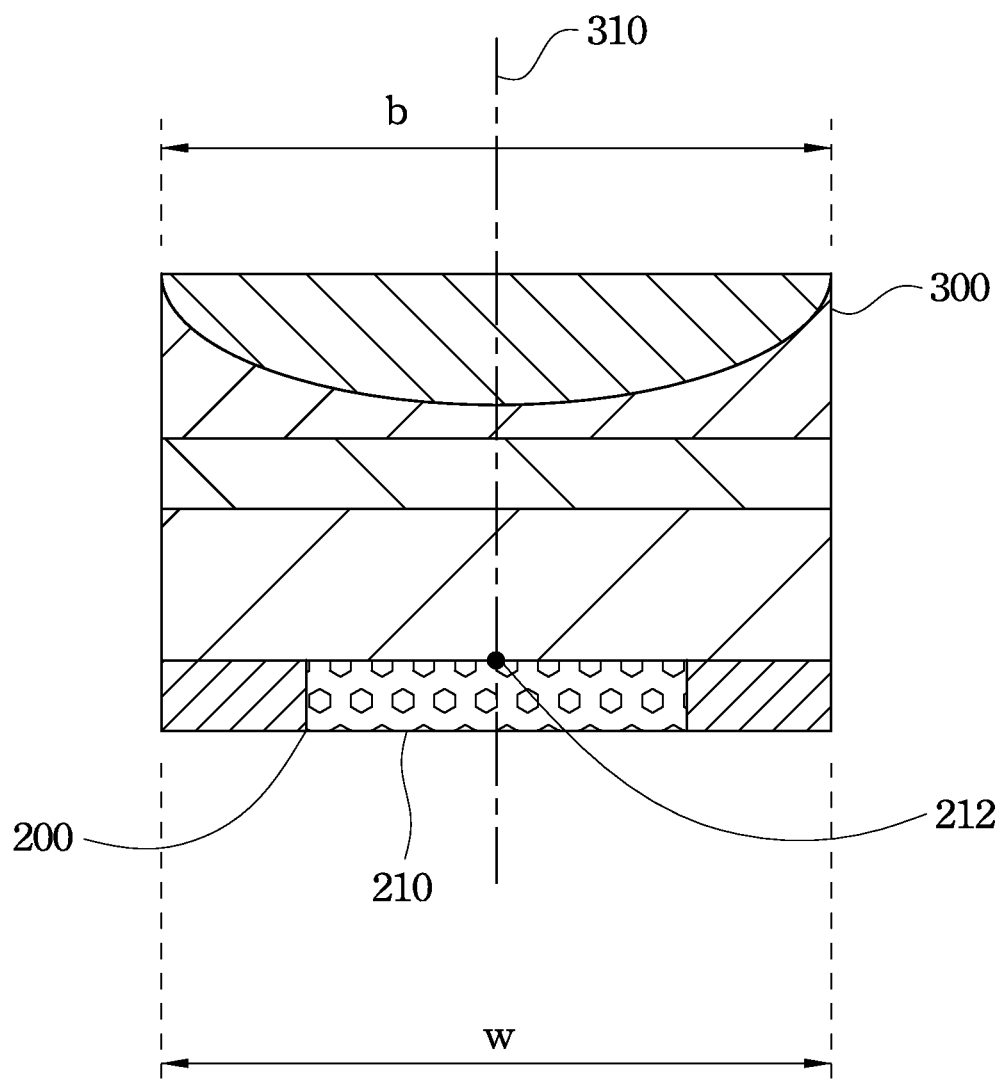
FIG. 2 is a cross-sectional view of the concave lens structure in accordance with one embodiment of the present invention.

FIG. 2 is a cross-sectional view of the concave lens structure 300 in accordance with one embodiment of the present invention. In this embodiment, the concave lens structure 300 has a center axis 310, and the light permeable area 210 of the sub-pixel 200 has a midpoint 212. The center axis 310 of the concave lens structure 300 crosses the midpoint 212 of the light permeable area 210 of the sub-pixel 200. In other words, the concave lens structure 300 and the light permeable area 210 of the sub-pixel 200 are both symmetric to the center axis 310 of the concave lens structure 300.

In some embodiments, each concave lens structure 300 has a width b, and each sub-pixel 200 has a width w. The width b of the concave lens structure 300 is substantially equal to the width w of the sub-pixel 200.

Figure 3:
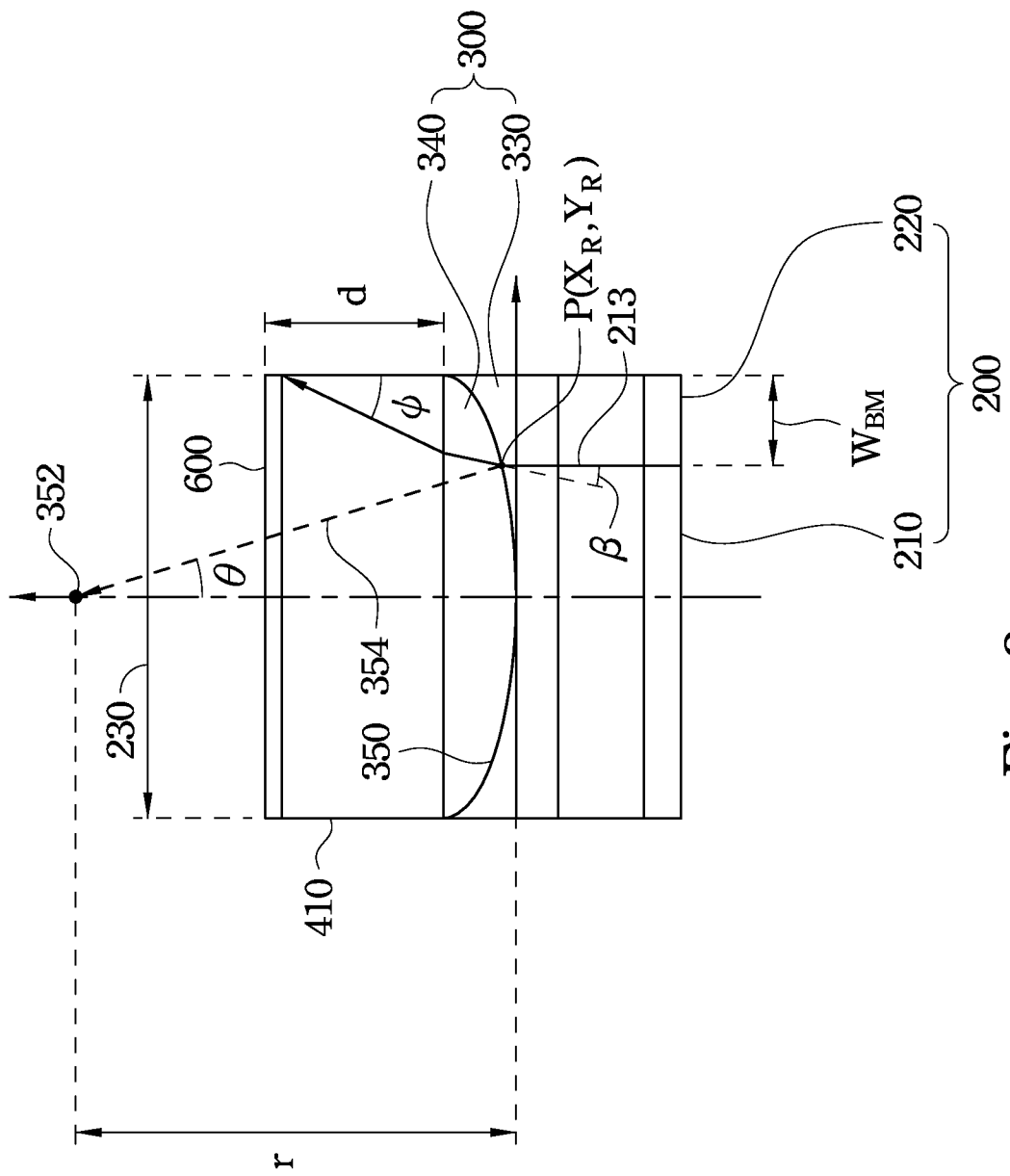
FIG. 3 is an optical path diagram of the concave lens structure in accordance with one embodiment of the present invention.

FIG. 3 is an optical path diagram of the concave lens structure 300 in accordance with one embodiment of the present invention. In this embodiment, the concave lens structure 300 includes a concave layer 330 and a convex layer 340. The concave layer 330 has a first refractive index. The convex layer 340 is adjacent to the concave layer 330, and the convex layer 340 and the concave layer 330 are complementary in shape. The convex layer 340 has a second refractive index lower than the first refractive index. As shown in FIG. 3, the light from the light permeable area 210 passes through the concave layer 330 prior to passing through the convex layer 340.

Specifically, the concave layer 330 is gradually caved downwards from the edges of the concave lens structure 300 to the center of the concave lens structure 300, and the convex layer 340 is gradually protruded upwards from the edges of the concave lens structure 300 to the center of the concave lens structure 300, so that the concave layer 330 and the convex layer 340 cooperate to form a shape of a concave lens. In other words, the thickness of the concave layer 330 gradually decreases along the direction from the light masking area 220 to the light permeable area 210, while the thickness of the convex layer 340 gradually increases along the direction from the light masking area 220 to the light permeable area 210.

In this embodiment, the border of the light permeable area 210 emits a border light 213. The border light 213 reaches the edge of the virtual sub-pixel pattern 600 by refraction via the interfaces among the concave layer 330, the convex layer 340, and the first middle layer 410. It is noted that only the border light 213 of the light permeable area 210 is shown for simplifying the figure. In fact, the light permeable area 210 emits numerous lights or light beams to the concave lens structure 300, and all of these lights or light beams fall in the virtual sub-pixel pattern 600.

In some embodiments, the first middle layer 410 has a thickness d, and the minimal distance between the virtual sub-pixel patterns 600 and the concave lens structures 300 is the thickness d of the first middle layer 410. In other words, the virtual sub-pixel pattern 600 can be formed on the top surface of the first middle layer 410.

In some embodiments, the concave layer 330 and convex layer 340 cooperate to form a curved interface 350. The curved interface 350 includes a particular point P, and the projection of the particular point P vertically projected to the sub-pixel 200 is located on the border between the light permeable area 210 and the light masking area 220.

Specifically, the border light 213 is vertically emitted from the edge of the light permeable area 210 to the concave lens structure 300, and it passes through the particular point P on the curved interface 350 and is refracted due to the difference between the first refractive index of the concave layer 330 and the second refractive index of the convex layer 340. It is noted that the curved interface 350 is a curve in view of the side view or the cross-sectional view, and nevertheless, the curved interface 350 can be an arc-shaped surface in a perspective view.

In order to entirely shade the light masking area 220 by the virtual sub-pixel pattern 600, in some embodiments, the thickness d of the first middle 410 satisfies:

$$d=\{w_{BM}-[Y_R(w/2)-Y_R(X_B)]\tan\beta\}\cot\Phi \quad \text{(Equation 1)}$$

In the Equation 1, the definition of each parameter is described below:
1. d is the thickness of the first middle layer 410;
2. $Y_R$ is a vertical distance between any point on the curved interface 350 and the apex of the curved interface 350;
3. $X_B$ is the horizontal distance between the particular point P and the symmetry axis of the curved interface 350;
4. w is the width of each of the sub-pixels 200;
5. $w_{BM}$ is the width of the light masking area 220;
6. β is the first refraction angle when the border light 213 from the light permeable area 210 passes through the particular point P;
7. Φ is a second refraction angle when the border light 213 passes through the interface between the convex layer 340 and the first middle layer 410.

By the foregoing parameters and the equation, the thickness d can make the virtual sub-pixel pattern 600 entirely cover the light masking area 220 of the sub-pixel 200, thereby solving the MLP issue. Further, the width of the virtual sub-pixel 600 generated by the foregoing equation is approximated to the width w of the sub-pixel 200, and the sub-pixels 200 are adjacent without intervals. Therefore, the virtual sub-pixel patterns 600 are also adjacent without intervals.

In some embodiments, the curved interface 350 comprises a center of curvature 352. The particular point P and the center of curvature 352 of the curved interface 350 draws an imaginary connecting line 354. In some embodiments, the first refraction angle β satisfies:

$$\beta = \sin^{-1}\left(\frac{n_1}{n_2}\sin\Theta\right) - \Theta \quad \text{(Equation 2)}$$

In the Equation 2, the parameters are defined below:
1. Θ is an angle included between the imaginary connecting line 354 and the vertical direction;
2. $n_1$ is the first refractive index of the concave layer 330;
3. $n_2$ is the second refractive index of the convex layer 340.

By the foregoing equation and the parameters, the first refraction angle β that is generated when the border light 213 of the light permeable area 210 passes through the particular point P can be obtained.

In some embodiments, the second refraction angle Φ satisfies:

$$\Phi = \sin^{-1}\left(\frac{n_2}{n_3}\sin\beta\right) \quad \text{(Equation 3)}$$

In Equation 3, the parameters are defined below:
1. β is the first refraction angle generated when the border light 213 of the light permeable area 210 passes through the particular point P;
2. $n_2$ is the second refractive index of the convex layer 340;
3. $n_3$ is a third refractive index of the first middle layer 410.

By the foregoing equation and parameters, the second refraction angle Φ that is generated when the border light 213 passes through the interface between the convex layer 340 and the first middle layer 410 can be obtained.

By putting the first refraction angle β and the second refraction angle Φ into the Equation 1, the required thickness d of the first middle layer 410 can be obtained, so that the virtual sub-pixel pattern 600 can entirely cover the light masking area 220 of the sub-pixel 200, thereby solving the issue of MLP.

In some embodiments, the ratio of the first refractive index of the concave layer 330 to the second refractive index of the convex layer 340 is greater than 1.07, so as to assist the light of the light permeable area 210 of the sub-pixel 200 to expand.

Example 1

Figure 4:
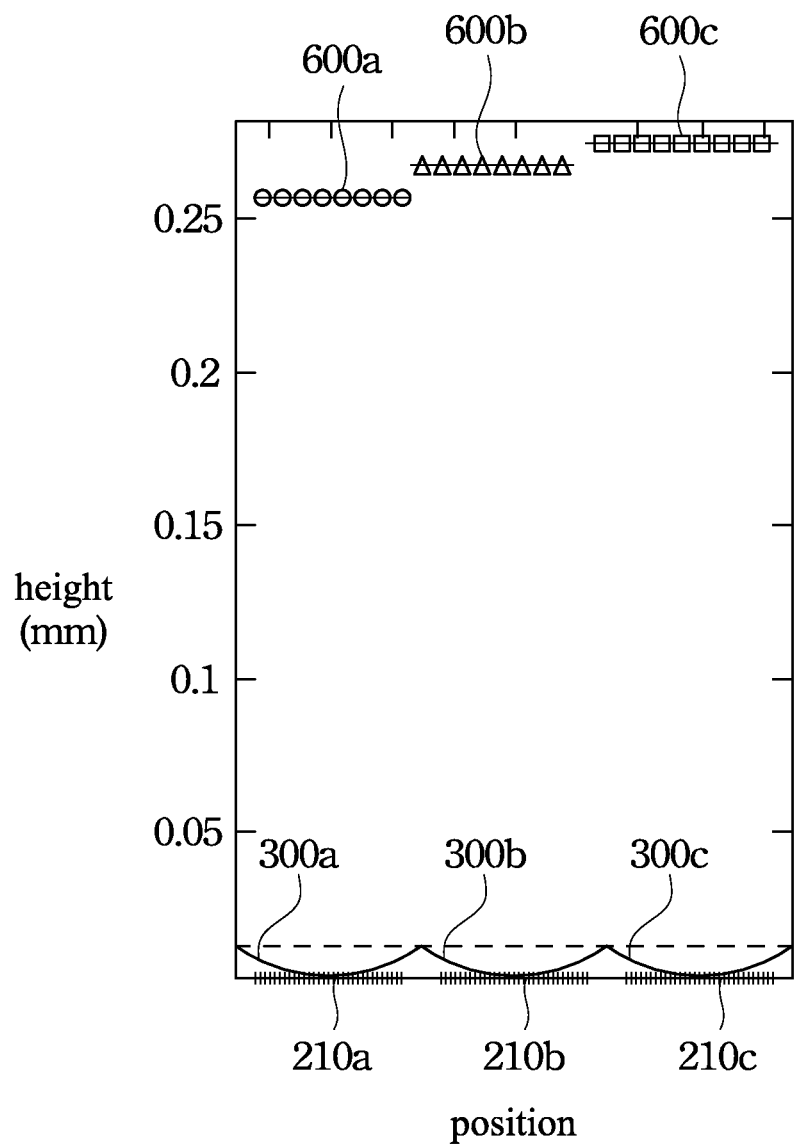
FIG. 4 is a schematic diagram of the virtual sub-pixel pattern in accordance with one example of the present invention.

FIG. 4 is a schematic diagram of the virtual sub-pixel pattern 600 in accordance with one example of the present invention. In this example, a first concave lens structure 300a, a second concave lens structure 300b and a third concave lens structure 300c are shown, and they are adjacent one by one. The projections of the first concave lens structure 300a, the second concave lens structure 300b and the third concave lens structure 300c respectively cover the first light permeable area 210a, the second light permeable area 210b and the third light permeable area 210c. The first concave lens structure 300a, the second concave lens structure 300b and the third concave lens structure 300c are respectively capable of expanding the illumination distribution of the light from the first light permeable area 210a, the second light permeable area 210b and the third light permeable area 210c, so as to respectively form the first virtual sub-pixel pattern 600a, the second virtual sub-pixel pattern 600b and the third virtual sub-pixel 600c.

In order to keep the figure remaining clear, the first virtual sub-pixel pattern 600a, the second virtual sub-pixel pattern 600b and the third virtual sub-pixel 600c are depicted at different levels. But it is noted that the first virtual sub-pixel pattern 600a, the second virtual sub-pixel pattern 600b and the third virtual sub-pixel 600c are all formed on the same level, and they are respectively spaced apart from the first concave lens structure 300a, the second concave lens structure 300b and the third concave lens structure 300c by a distance. This distance is the thickness d of the first middle layer 410 (See FIG. 3). It is also noted that the first light permeable area 210a, the second light permeable area 210b and the third light permeable area 210c are respectively disposed in different sub-pixels 200 (See FIG. 3).

In this embodiment, the center axis 310 (See FIG. 2) of the first concave lens structure 300a, the second concave lens structure 300b and the third concave lens structure 300c respectively cross the midpoint 212 (See FIG. 2) of the first light permeable area 210a, the second light permeable area 210b and the third light permeable area 210c without deviation. Therefore, the first virtual sub-pixel pattern 600a, the second virtual sub-pixel pattern 600b and the third virtual sub-pixel pattern 600c are exactly adjacent without overlap.

In this embodiment, the concave layers 330 (See FIG. 3) of the first concave lens structure 300a, the second concave lens structure 300b and the third concave lens structure 300c have the first refractive index, and the first refractive index is 1.59, and the second refractive index of the convex layer 340 (See FIG. 3) is 1.48. The width b (See FIG. 2) of the first concave lens structure 300a, the second concave lens structure 300b or the third concave lens structure 300c is about 0.06 mm. The curvature radius r of the curved interface 350 of the first concave lens structure 300a, the second concave lens structure 300b or the third concave lens structure 300c is about 0.045 mm. The thickness of the first concave lens structure 300a, the second concave lens structure 300b and the third concave lens structure 300c is about 0.0115 mm. The thickness d of the first middle layer 410 is about 0.25 mm.

Figure 5:
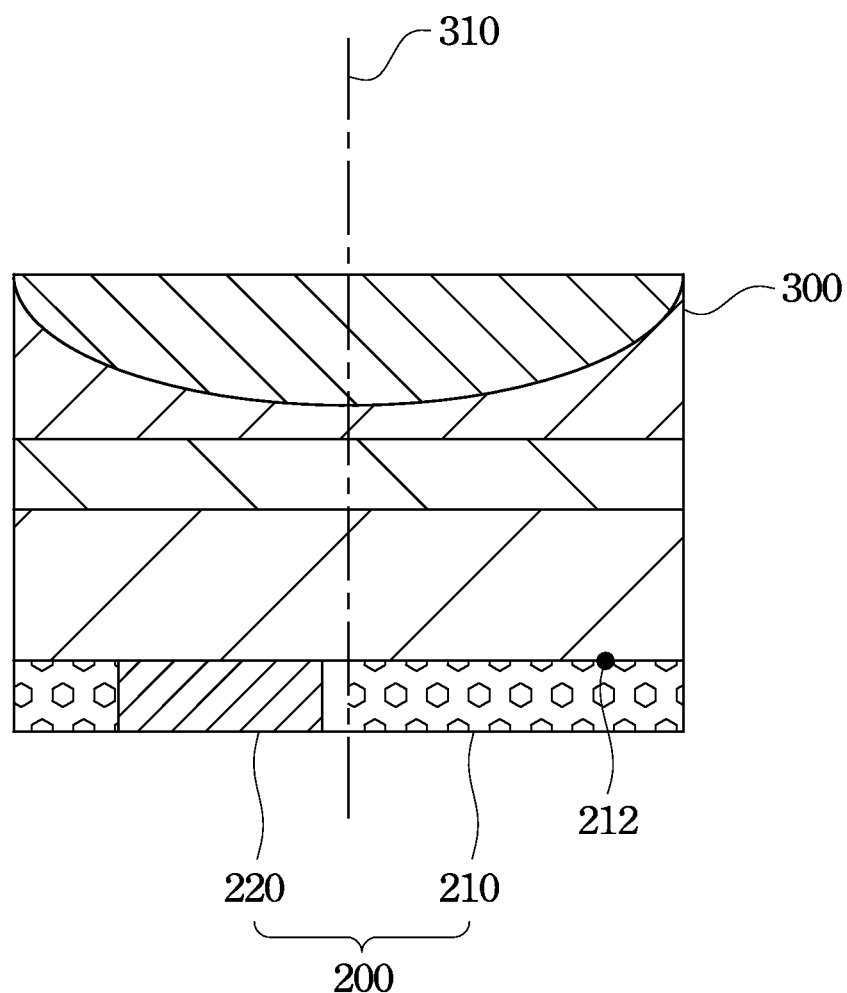
FIG. 5 is a cross-sectional view of the concave lens structure in another embodiment of the present invention.

FIG. 5 is a cross-sectional view of the concave lens structure 300 in another embodiment of the present invention. This embodiment is similar to which is shown in FIG. 2, and the main difference is that the midpoint 212 of the light permeable area 210 of the sub-pixel 200 deviates from the center axis 310 of the concave lens structure 300 on the optical path of the light permeable area 210 of the corresponding sub-pixel 200 and defines a deviation value. In other words, the midpoint 212 of the light permeable area 210 is deviated from the axis 310 of the concave lens structure 300, rather than being cross the axis 310. The examples described below are to discuss position relations of the virtual sub-pixel patterns 600 at different deviation values.

Example 2

Figure 6:
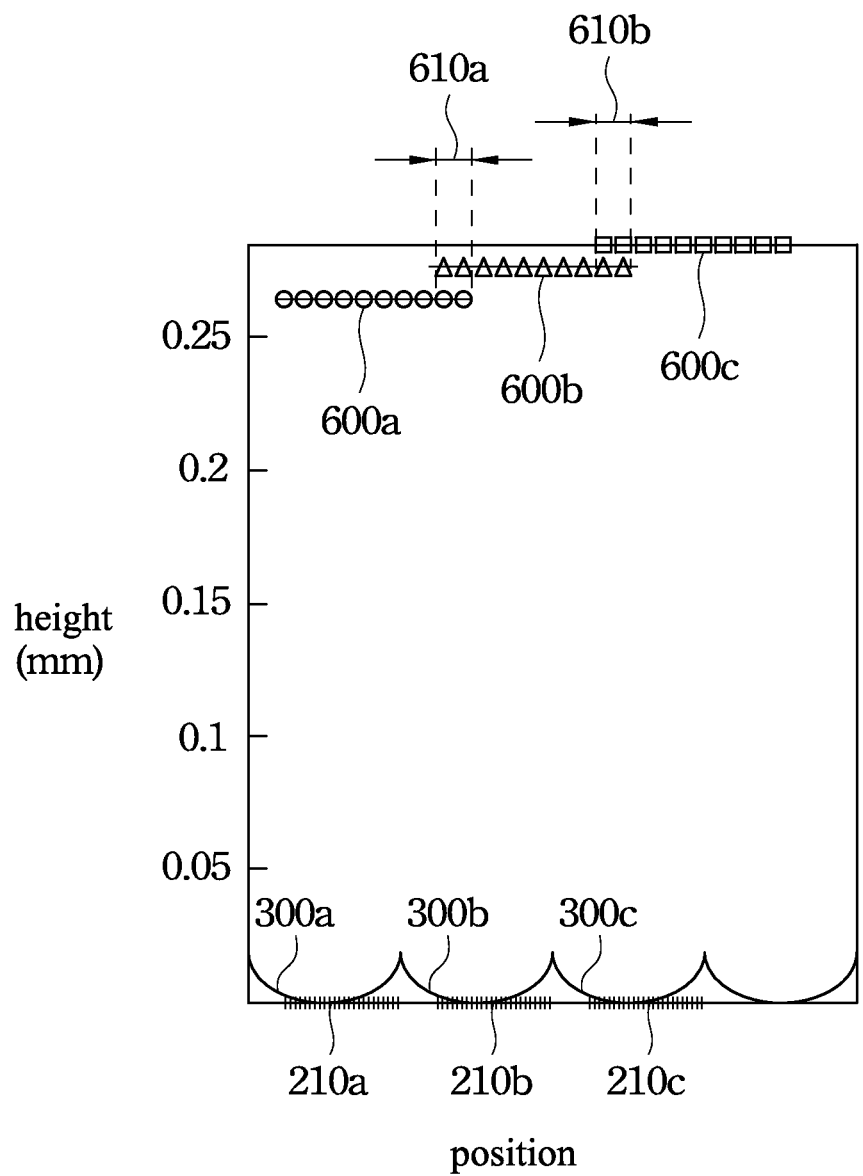
FIG. 6 is a schematic diagram of the virtual sub-pixel patterns in accordance with another example of the present invention.

FIG. 6 is a schematic diagram of the virtual sub-pixel patterns 600 in accordance with another example of the present invention. This figure is similar to which is shown in FIG. 4, and the main difference is that the first light permeable area 210a, the second light permeable area 210b and the third light permeable area 210c are slightly deviated from the first concave lens structure 300a, the second concave lens structure 300b and the third concave structure 300c, so that the boundaries of the first virtual sub-pixel pattern 600a, the second sub-pixel pattern 600b and the third virtual sub-pixel pattern 600c partially overlap.

In other words, the first virtual sub-pixel pattern 600a and the second virtual sub-pixel pattern 600b form a first overlapping area 610a therebetween. The second virtual sub-pixel pattern 600b and the third virtual sub-pixel pattern 600c form a second overlapping area 610b therebetween.

In this example, the deviation values of the first light permeable area 210a, the second light permeable area 210b and the third light permeable area 210c are 0.01 mm. The deviation values of the first concave lens structure 300a, and the second concave lens structure 300b and the third concave structure 300c are also 0.01 mm.

In this example, the concave layers 330 (See FIG. 3) of the first concave lens structure 300a, the second concave lens structure 300b and the third concave lens structure 300c have the first refractive index, and the first refractive index is 1.59, and the second refractive index of the convex layer 340 (See FIG. 3) is 1.48. The width b (See FIG. 2) of the first concave lens structure 300a, the second concave lens structure 300b or the third concave lens structure 300c is about 0.06 mm. The curvature radius r of the curved interface 350 of the first concave lens structure 300a, the second concave lens structure 300b or the third concave lens structure 300c is about 0.036 mm. The thickness of the first concave lens structure 300a, the second concave lens structure 300b and the third concave lens structure 300c is about 0.0161 mm. The thickness d of the first middle layer 410 is about 0.25 mm.

Example 3

Figure 7:
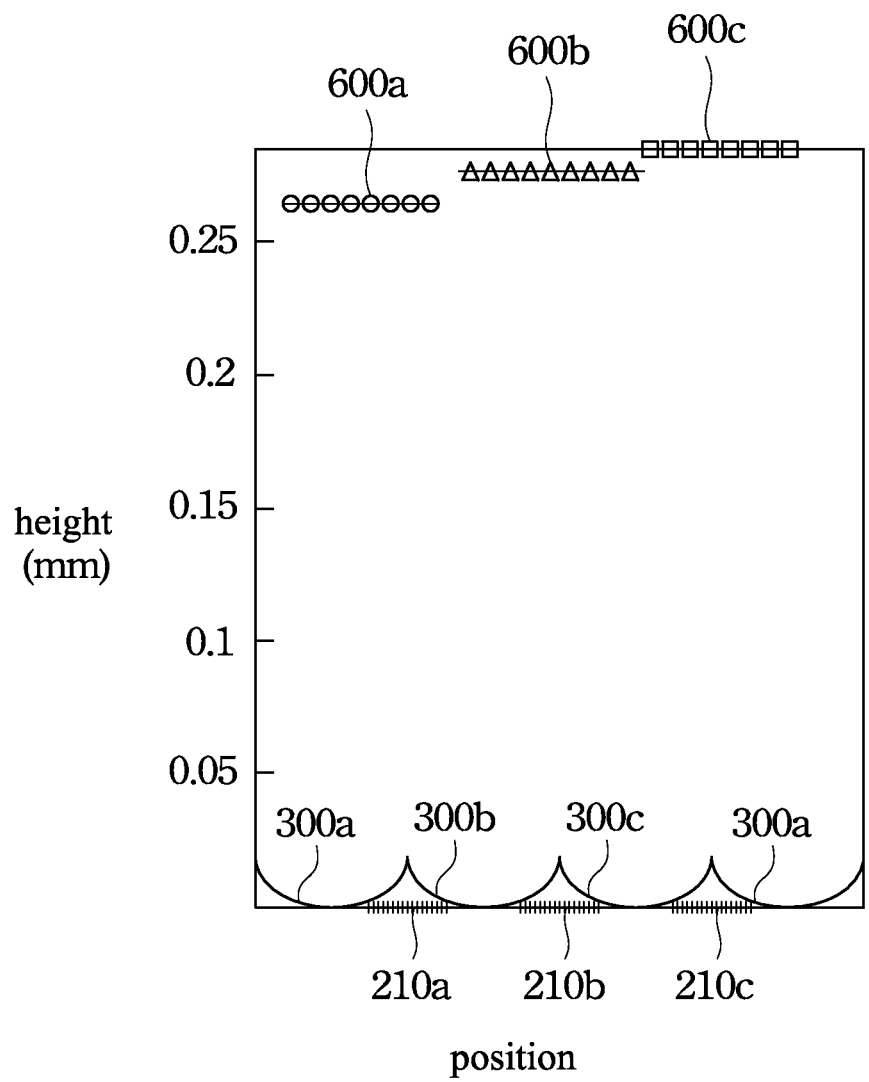
FIG. 7 is a schematic diagram of the virtual sub-pixels patterns 600 in accordance with yet another embodiment of the present invention.

FIG. 7 is a schematic diagram of the virtual sub-pixels patterns 600 in accordance with yet another embodiment of the present invention. This example is similar to which is shown in FIG. 6, and the main difference is that the deviation values of the first light permeable area 210a, the second light permeable area 210b and the third light permeable area 210c are higher than which of FIG. 6. Specifically, the first light permeable area 210a is deviated to the position between the first concave lens structure 300a and the second concave lens structure 300b. The second light permeable area 210b is deviated to the position between the second concave lens structure 300b and the third concave lens structure 300c. The third light permeable area 210c is deviated to the position between the third concave lens structure 300c and the next first concave lens structure 300a.

As shown in this figure, the first virtual sub-pixel pattern 600a, the second virtual sub-pixel pattern 600b and the third virtual sub-pixel pattern 600c are almost not overlapped.

In this example, the deviation value of the first light permeable area 210a, the second light permeable area 210b and the third light permeable area 210c are 0.03 mm. The deviation values of the first concave lens structure 300a, the second concave lens structure 300b and the third concave structure 300c are also 0.03 mm.

Except for the differences of deviation values, other parameters in this example, such as the first refractive index, the second refractive index, the width or thickness of the first concave lens structure 300a, the second concave lens structure 300b and the third concave lens structure 300c and so on, are all the same as the example of FIG. 6.

Therefore, by modifying the deviation value, the overlapping extent between the first virtual sub-pixel pattern 600a, the second virtual sub-pixel pattern 600b and the third virtual sub-pixel pattern 600c can be increased or decreased.

Figure 8:
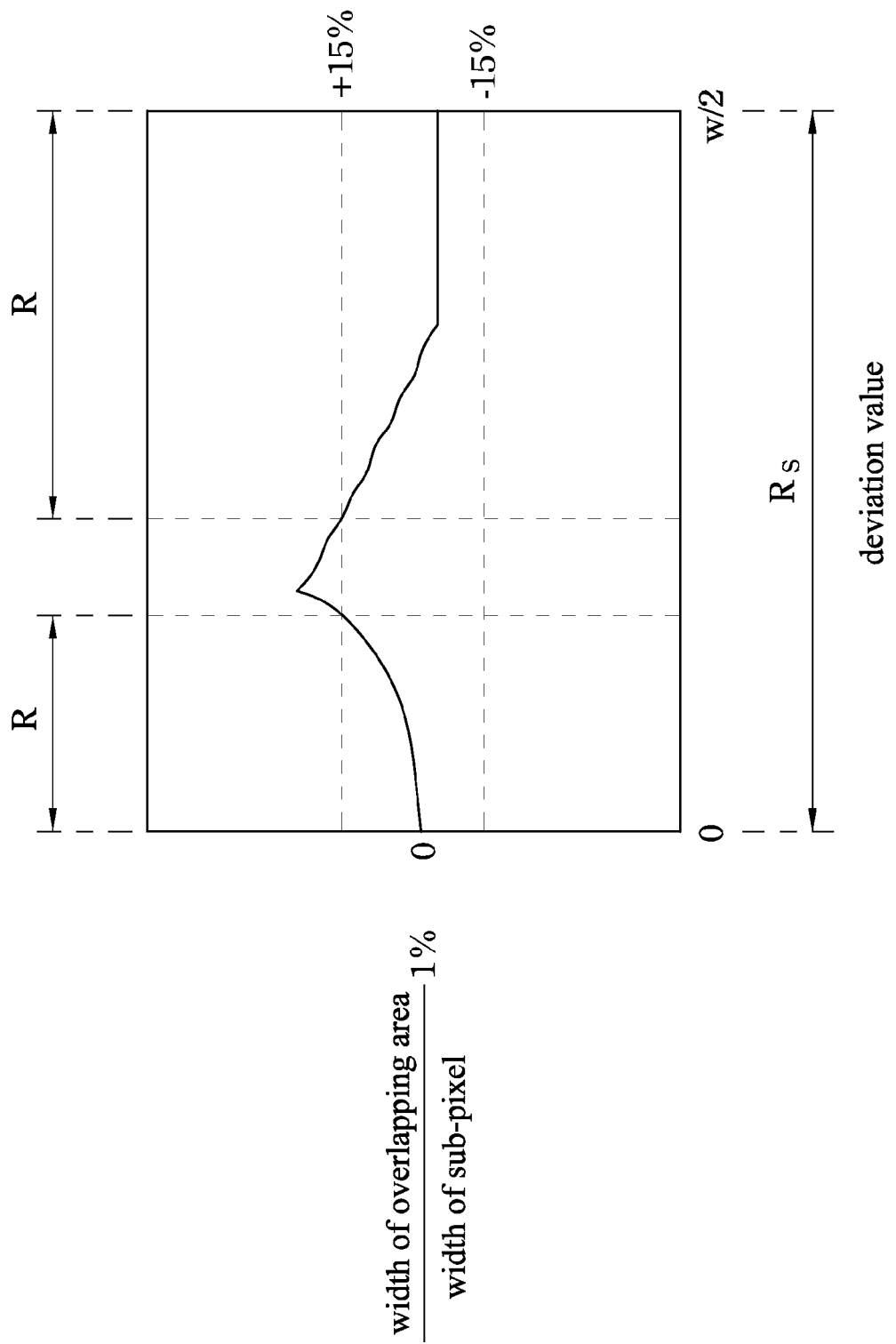
FIG. 8 is a diagram illustrating the relation between the deviation value and the overlapping extent.

In order to control the overlapping extent, FIG. 8 is disclosed, which is a diagram illustrating the relation between the deviation value and the overlapping extent. The horizontal axis in this figure refers to the deviation value between the light permeable area 210 and the concave lens structure 300, and the vertical axis refers to the ratio of the width of the overlapping area formed between adjacent virtual sub-pixel patterns 600 to the width w of the sub-pixel 200.

A certain relation between the width of the overlapping area and the deviation value is shown in this figure. Further, the width of the overlapping area is especially high in a particular range. Preferably, the ratio of the width of the overlapping area to the width w of the sub-pixel 200 is less than about 0.15 (namely, in the range encompassed by two horizontal dash lines on the figure). If the width of the overlapping area is S, the ratio of the width S of the overlapping area to the width w of the sub-pixel 200 satisfies: S/w<0.15.

In some embodiments, the deviation value is in a particular range Rs, and the particular range Rs is greater than zero and less than half of the width of each of the sub-pixels 200. In some embodiments, the particular range Rs comprises at least one allowable range R, and the deviation value in the allowable range R makes the ratio of the width of the overlapping area to the width w of the sub-pixel 200 less than 0.15. The ratio of the allowable range to the particular range is greater than 0.8. In other words, if the width of the overlapping area is S and S/w<0.15, the following equation is satisfied: R/Rs>0.8.

In other words, the ratio of the allowable range R to the particular Rs is greater than 0.8, and the deviation value in the allowable range R makes the ratio of the width of the overlapping area to the width w of the sub-pixel 200 less than 0.15. Namely, if the width of the overlapping area is S, the following equation is satisfied: S/w<0.15.

Figure 9:
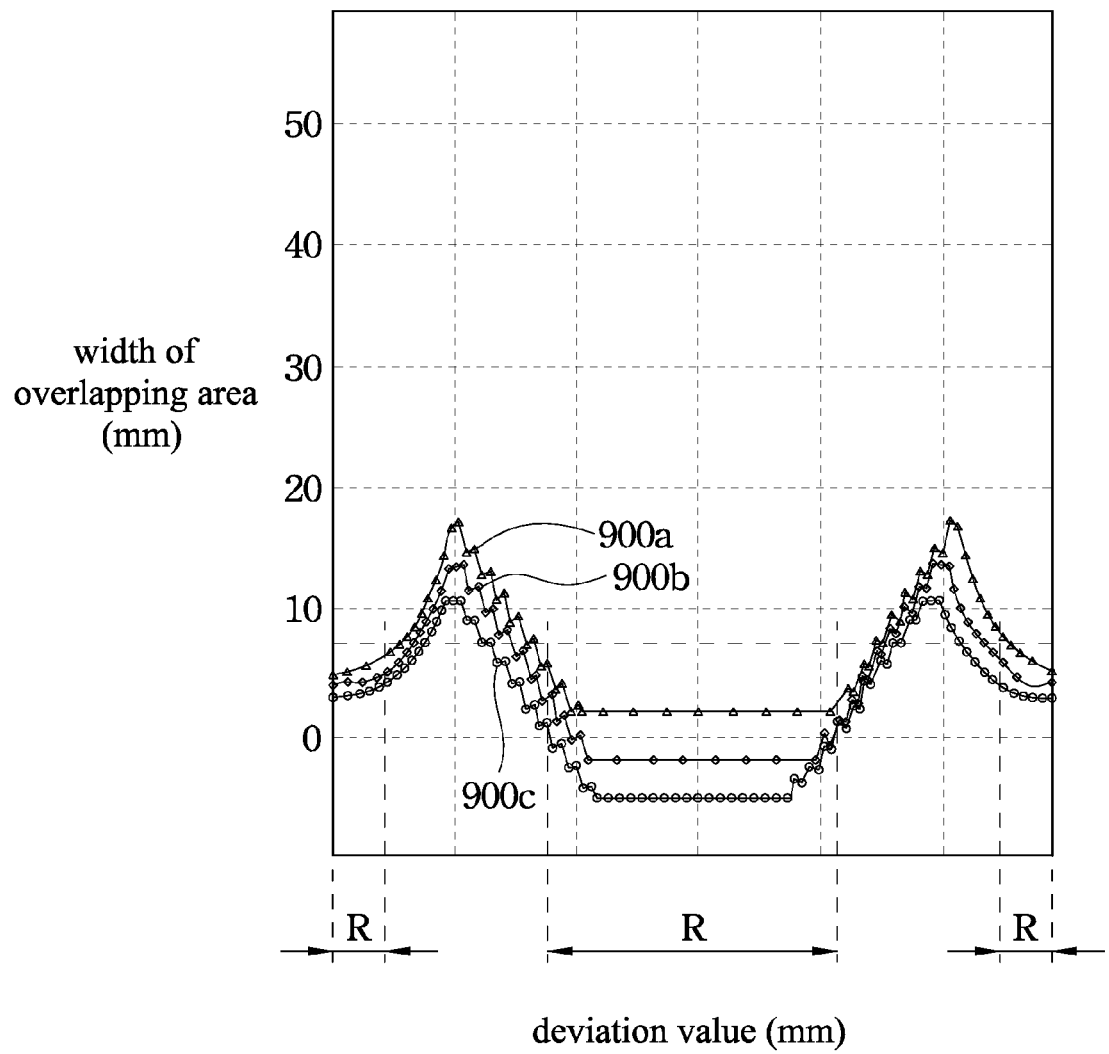
FIGS. 9-11 respectively illustrate the relations between the deviation value and the overlapping extent at various thick d of the first middle layer.
Figure 10:
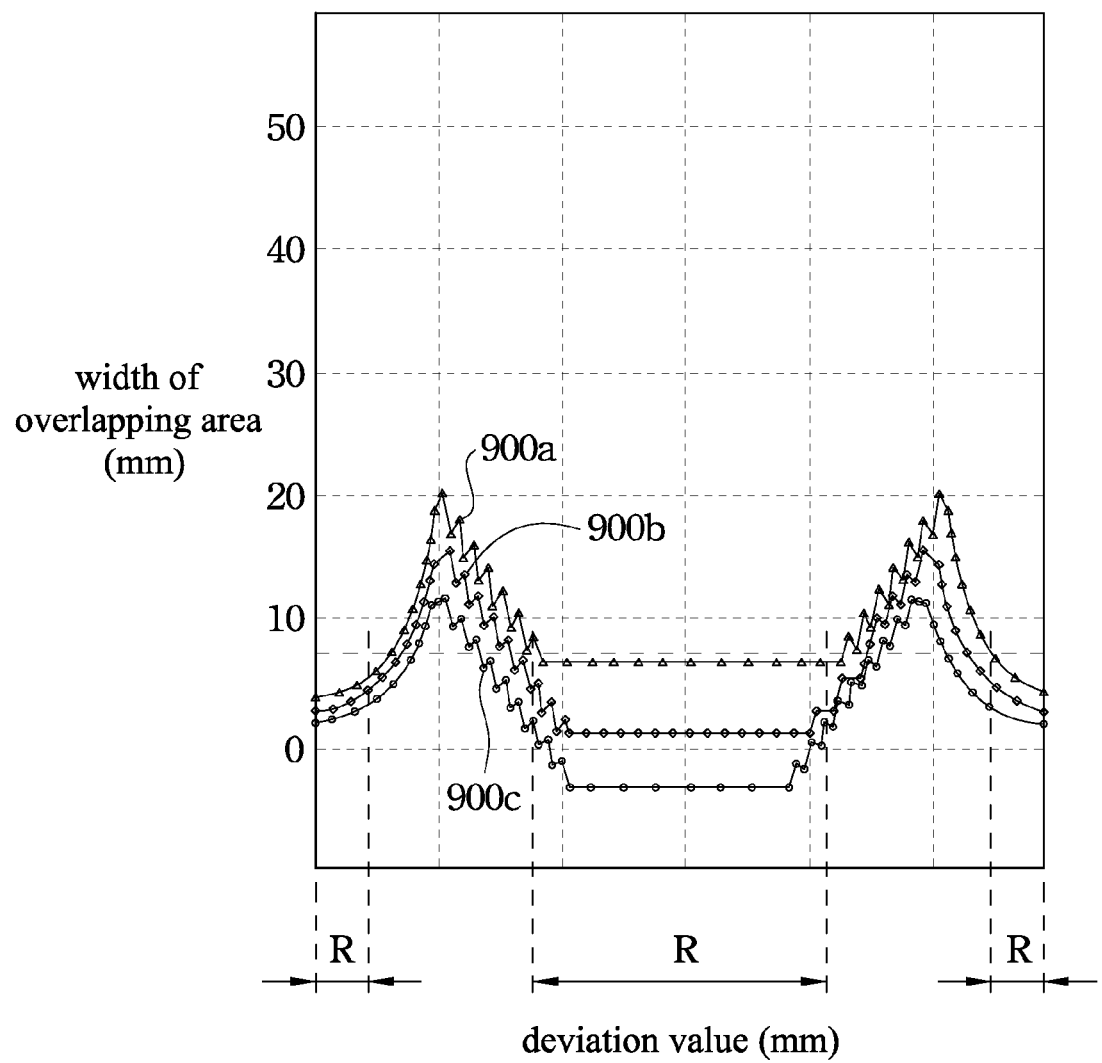
Figure 11:
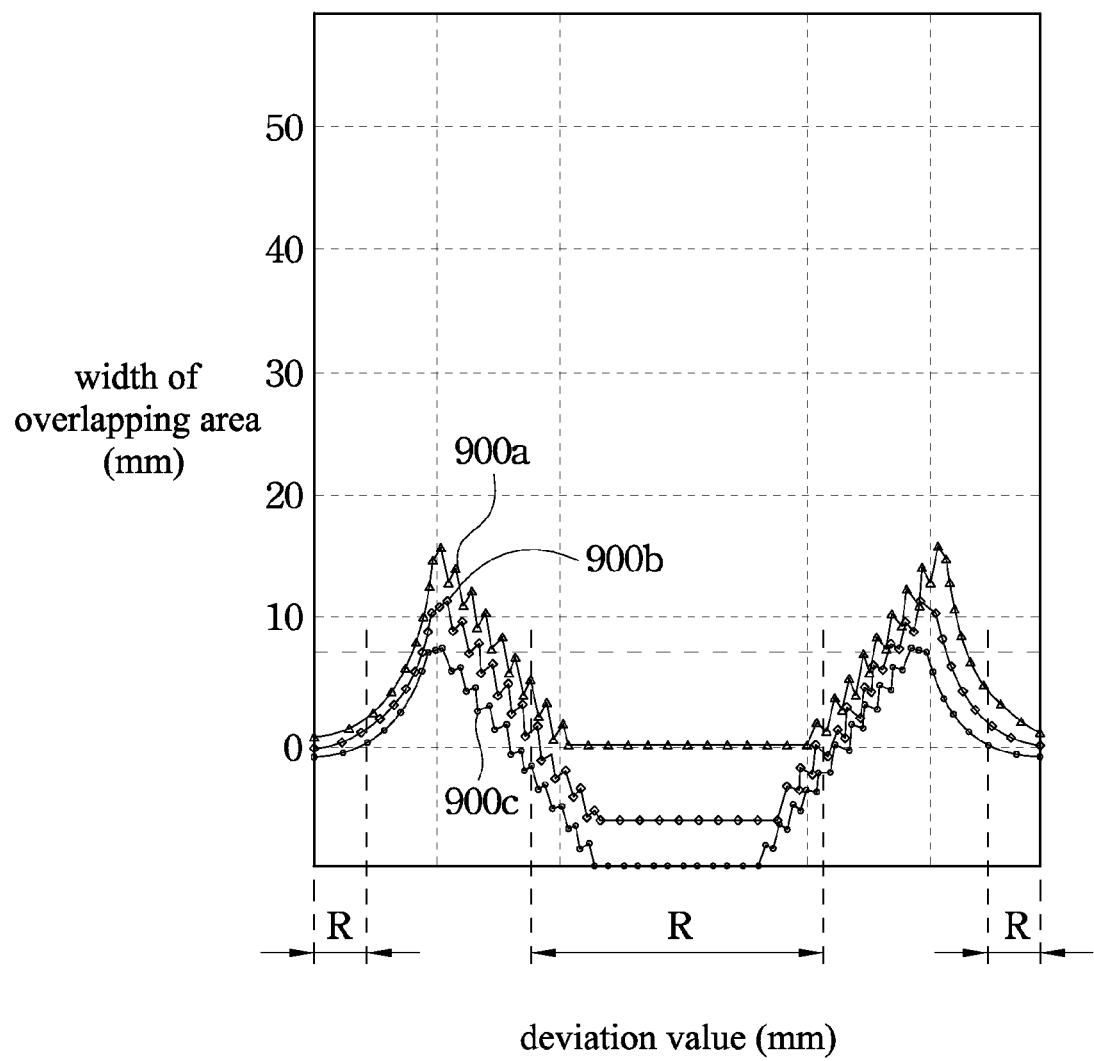

Not only the deviation value affects the overlapping extent of the virtual sub-pixel patterns 600, but also the thickness d of the first middle layer 410 may slightly affect the overlapping extent, such as the examples shown in FIGS. 9-11. FIGS. 9-11 respectively illustrate the relations between the deviation value and the overlapping extent at various thick d of the first middle layer 410. It is noted that not only the thickness d of the first middle layer 410 is different, but also some parameters are slightly different, as shown below:

|  | Thickness of the first middle layer (mm) | Thickness of the concave lens structure (mm) | Radius of curvature of the concave lens structure (mm) |
| --- | --- | --- | --- |
| FIG. 9 | 0.250 | 0.0170 | 0.0350 |
| FIG. 10 | 0.225 | 0.0171 | 0.0340 |
| FIG. 11 | 0.188 | 0.0174 | 0.0337 |

Referring to FIGS. 9-11, it can be noted the allowable range R can be modified by adjusting the thickness d of the first middle layer 410.

Not only the deviation value and the thickness d of the first middle layer 410 affect the overlapping extent of the virtual sub-pixels 600, but also the width b of the concave lens structure 300 may affect the overlapping extent.

As shown in FIGS. 9-11, a first curve 900a, a second curve 900b and a third curve 900c are illustrated therein. When the width b of the concave lens structure 300 is 0.061 mm, the relation between the deviation value and the width of the overlapping area is close to the first curve 900a. When the width b of the concave lens structure 300 is 0.060 mm, the relation between the deviation value and the width of the overlapping area is close to the second curve 900b. When the width b of the concave lens structure 300 is 0.059 mm, the relation between the deviation value and the width of the overlapping area is close to the third curve 900c.

It can be observed that, at the same horizontal axis value, the vertical axis value of the first curve 900a is higher than which of the second curve 900b, and the vertical axis value of the second curve 900b is higher than which of the third curve 900c. In other words, when the deviation value is the same and the width b of the concave lens structure 300 gets higher, the overlapping extent of the virtual sub-pixel pattern 600 becomes higher.

Referring to FIG. 1, in some embodiments, the first middle layer 410 includes a top surface 412, and the top surface 412 contacts a second middle layer 420, and the second middle layer 420 is formed between the lenticular layer 500 and the first middle layer 410. The virtual sub-pixel patterns 600 are formed on the top surface 412. In other words, the virtual sub-pixel pattern 600 is formed between the first middle layer 410 and the second middle layer 420.

In some embodiments, the first middle layer 410 is formed between the concave lens structure 300 and the lenticular layer 500, and in particular, the first middle layer 410 is formed between the concave lens structure 300 and the second middle layer 420. In other words, the concave lens structure 300 and the second middle layer 420 respectively contact opposite sides of the first middle layer 410.

In some embodiments, the concave lens structure 300 can be formed by two kinds of UV resin having different refractive index.

In some embodiments, the material of the first middle layer 410 may include, but is not limited to include, the glass or Polyethylene Terephthalate (PET).

In some embodiments, the lenticular layer 500 may include optical structures for forming 3D images, and the optical structure can be, for example, the lenticular lens. In some embodiments, the second middle layer 420 can further include the optical structure for switching the display mode between two dimensions and three dimensions, and the optical structure can be, for example, the liquid crystal switching cell. In some embodiments, the lenticular layer 500 is a convex lens, and the thickness of the second middle layer 420 is depending on the focal length of the convex lens.

In some embodiments, the autostereoscopic display apparatus may further include a light permeable substrate 700, and this light permeable substrate 700 is disposed on the sub-pixel 200. The material of the light permeable substrate 700 may include, but is not limited to include, the glass. Specifically, the light permeable substrate is an upper substrate of a LCD panel. The substrate 100 is a lower substrate of the LCD panel, and a liquid crystal layer disposed between the upper substrate and the lower substrate. The LCD panel can be replaced by other types of displays, such as organic light emitting diode (OLED) display, electrophoretic display (EPD) or field emission display (FED), etc.

In some embodiments, the autostereoscopic display apparatus may include a polarization layer 800. The polarization layer 800 is disposed on the light permeable substrate 700. Specifically, the light permeable substrate 700 and the polarization layer 800 can be formed between the sub-pixel 200 and the concave lens structure 300. Besides, another polarization layer (not shown) can be formed on the lower surface of the substrate 100.

Although the present invention has been described in considerable detail with reference to certain embodiments thereof, other embodiments are possible. Therefore, the spirit and scope of the appended claims should not be limited to the description of the embodiments contained herein.

It will be apparent to those ordinarily skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An autostereoscopic display apparatus, comprising:
a substrate;
a plurality of sub-pixels disposed on the substrate, each of the sub-pixels comprising a light permeable area and at least one light masking area;
a plurality of concave lens structures respectively disposed on the sub-pixels and on the optical paths of the light permeable areas of the sub-pixels;
a first middle layer disposed on the concave lens structures, wherein the concave lens structures are used to expand the illumination distribution of the light from the light permeable areas of the sub-pixels, so as to form a plurality of virtual sub-pixel patterns in the first middle layer, wherein the virtual sub-pixel patterns are respectively projected from the sub-pixels to cover the light permeable areas and the light masking areas of the sub-pixels; and
a lenticular layer, wherein the focal point of the lenticular layer falls on the virtual sub-pixel patterns.

2. The autostereoscopic display apparatus of claim 1, wherein the virtual sub-pixel patterns are adjacent to each other without intervals.

3. The autostereoscopic display of claim 2, wherein the virtual sub-pixels are partially overlapped to each other at a boundary.

4. The autostereoscopic display of claim 2, wherein the center axis of each of the concave lens structures crosses the midpoint of the light permeable area of each of the sub-pixels respectively.

5. The autostereoscopic display apparatus of claim 2, wherein each of the concave lens structures is substantially equal to each of the sub-pixels in width.

6. The autostereoscopic display apparatus of claim 1, wherein each of the concave lens structures comprises:
   a concave layer having a first refractive index; and
   a convex layer adjacent to the concave layer, wherein the convex layer and the concave layer are complementary in shape, and the convex layer has a second refractive index lower than the first refractive index;
   wherein the light from the light permeable area of one of the sub-pixels passes through the concave layer prior to passing through the convex layer.

7. The autostereoscopic display apparatus of claim 6, wherein the minimal distance between the virtual sub-pixel patterns and the concave lens structures is the thickness of the first middle layer.

8. The autostereoscopic display apparatus of claim 7, wherein the concave layer in associate with and the convex layer form a curved interface, wherein the curved interface comprises a particular point, and the particular point is vertically projected to the sub-pixel located on a boundary of the light permeable area and the light masking area, and the thickness of the first middle layer satisfies:

$$d = \{w_{BM} - [Y_R(w/2) - Y_R(X_B)] \tan \beta\} \cot \Phi,$$

wherein d is the thickness of the first middle layer, and $Y_R$ is a vertical distance between any point on the curved interface and the apex of the curved interface, and $X_B$ is the horizontal distance between the particular point and the symmetry axis of the curved interface, and w is the width of each of the sub-pixels, and $w_{BM}$ is the width of the light masking area; and wherein the light permeable area is capable of vertically emitting a border light to the particular point, and β is a first refraction angle when the border light passes through the particular point, and Φ is a second refraction angle when the border light passes through the interface between the convex layer and the first middle layer.

9. The autostereoscopic display apparatus of claim 8, wherein the first refraction angle satisfies:

$$\beta = \sin^{-1}\left(\frac{n_1}{n_2}\sin\Theta\right) - \Theta,$$

wherein the curved interface comprises a center of curvature, and the particular point and the center of curvature draws an imaginary connecting line, and Θ is an angle included between the imaginary connecting line and the vertical direction, and wherein $n_1$ is the first refractive index, and $n_2$ is the second refractive index.

10. The autostereoscopic display apparatus of claim 8, wherein the second refraction angle satisfies:

$$\Phi = \sin^{-1}\left(\frac{n_2}{n_3}\sin\beta\right),$$

wherein $n_2$ is the second refractive index, the first middle layer has a third refractive index, and $n_3$ is the third refractive index.

11. The autostereoscopic display apparatus of claim 6, wherein the ratio of the first refractive index to the second refractive index is greater than 1.07.

12. The autostereoscopic display apparatus of claim 1, wherein the virtual sub-pixel patterns adjacent to each other form an overlapping area, and the ratio of the width of the overlapping area to the width of each of the sub-pixels is less than 0.15.

13. The autostereoscopic display apparatus of claim 12, wherein the midpoint of the light permeable area of at least one of the sub-pixels deviates from the center axis of the concave lens structure on the optical path of the light permeable area of a corresponding one of the sub-pixels and defines a deviation value, wherein the deviation value is in a particular range, which is greater than zero and less than half of the width of each of the sub-pixels.

14. The autostereoscopic display apparatus of claim 13, wherein the particular range comprises at least one allowable range, and the deviation value in the allowable range makes the ratio of the width of the overlapping area to the width of each of the sub-pixels less than 0.15, wherein the ratio of the allowable range to the particular range is greater than 0.8.

15. The autostereoscopic display apparatus of claim 1, wherein the first middle layer comprises a top surface, and the virtual sub-pixel patterns are formed on the top surface.

16. The autostereoscopic display apparatus of claim 15, wherein the first middle layer is disposed between the concave lens structures and the lenticular layer.

* * * * *